United States Patent
Shin et al.

(10) Patent No.: US 11,405,108 B2
(45) Date of Patent: Aug. 2, 2022

(54) MULTI-CHANNEL, BI-DIRECTIONAL OPTICAL COMMUNICATION MODULE

(71) Applicant: Opto Electronics Solutions, Gwangju (KR)

(72) Inventors: Dong Jin Shin, Gwangju (KR); Ki Young Yang, Gwangju (KR); Min Soo Han, Gwangju (KR); Hyun Jea Kim, Gwangju (KR); Hye Soo Ma, Gwangju (KR)

(73) Assignee: Opto Electronics Solutions, Gwangju (KR)

( * ) Notice: Subject to any disclaimer, the term of this patent is extended or adjusted under 35 U.S.C. 154(b) by 0 days.

(21) Appl. No.: 17/295,539

(22) PCT Filed: Nov. 30, 2018

(86) PCT No.: PCT/KR2018/015035
§ 371 (c)(1),
(2) Date: May 20, 2021

(87) PCT Pub. No.: WO2020/105779
PCT Pub. Date: May 28, 2020

(65) Prior Publication Data
US 2022/0014272 A1    Jan. 13, 2022

(30) Foreign Application Priority Data
Nov. 20, 2018   (KR) ..................... 10-2018-0143601

(51) Int. Cl.
*H04B 10/25*    (2013.01)
*H04B 10/40*    (2013.01)
(Continued)

(52) U.S. Cl.
CPC ....... *H04B 10/25891* (2020.05); *H04B 10/40* (2013.01); *H04B 10/501* (2013.01);
(Continued)

(58) Field of Classification Search
None
See application file for complete search history.

(56) References Cited

U.S. PATENT DOCUMENTS

| 5,680,235 A |  | 10/1997 | Johansson |
| 6,768,578 B1 | * | 7/2004 | Kinoshita ........... H01S 3/13013 359/341.1 |

(Continued)

FOREIGN PATENT DOCUMENTS

| KR | 10-2012-0009785 | 2/2012 |
| KR | 10-2013-0045583 | 5/2013 |

(Continued)

OTHER PUBLICATIONS

International Search Report and the Written Opinion dated Aug. 7, 2019 From the International Searching Authority Re. Application No. PCT/KR2018/015035 and Its Translation of Search Report Into English. (9 Pages).

*Primary Examiner* — Darren E Wolf

(57) ABSTRACT

Provided is a multi-channel, bi-directional optical communication module. The multi-channel, bi-directional optical communication module includes a transmission unit transmitting an optical transmission signal for each of a plurality of channels, a multiplexer multiplexing the transmitted optical transmission signal for each of the plurality of channels to output a multi-channel optical transmission signal, a circulator passing the multi-channel optical transmission signal output from the multiplexer therethrough to transmit the multi-channel optical transmission signal to an optical fiber and reflecting a multi-channel optical reception signal received from the optical fiber, a demultiplexer demultiplexing the multi-channel optical reception signal reflected from the circulator to output an optical reception signal for each of the plurality of channels, a reception unit receiving the output optical reception signal for each of the (Continued)

plurality of channels and converting the received optical reception signal into an electrical signal for each of the plurality of channels, and a body unit in which the transmission unit, the multiplexer, the circulator, the demultiplexer, and the reception unit are disposed, in which a wavelength of the optical transmission signal for each of the plurality of channels is the same as a wavelength of the optical reception signal for each of the plurality of channels, and the circulator includes a first optical filter which passes a multi-channel optical transmission signal incident to a surface thereof therethrough and reflects a multi-channel optical reception signal incident to the other surface thereof, and a second optical filter which is disposed in parallel with the first optical filter and reflects the multi-channel optical reception signal reflected from the first optical filter to the demultiplexer.

12 Claims, 11 Drawing Sheets

(51) Int. Cl.
*H04B 10/50* (2013.01)
*H04B 10/66* (2013.01)
*H04J 14/02* (2006.01)

(52) U.S. Cl.
CPC .......... *H04B 10/66* (2013.01); *H04J 14/0202* (2013.01); *H04J 14/0216* (2013.01)

(56) References Cited

U.S. PATENT DOCUMENTS

| | | | |
|---|---|---|---|
| 6,788,898 B1* | 9/2004 | Britz | H04B 10/1125 398/118 |
| 7,809,268 B2* | 10/2010 | Meli | H04J 14/0246 380/278 |
| 8,971,709 B2* | 3/2015 | Liu | H04B 10/506 398/67 |
| 2004/0151420 A1* | 8/2004 | Goodfellow | H04J 14/0213 385/37 |
| 2004/0234262 A1* | 11/2004 | Bortz | H04J 14/0221 398/45 |
| 2009/0010600 A1* | 1/2009 | Kim | G02B 6/4246 385/90 |
| 2014/0168631 A1* | 6/2014 | Haslim | G01S 7/4812 356/4.01 |
| 2017/0019168 A1 | 1/2017 | Menard et al. | |

FOREIGN PATENT DOCUMENTS

KR 10-2016-0120385 10/2016
WO WO 2020/105779 5/2020

* cited by examiner

[FIG. 1A]
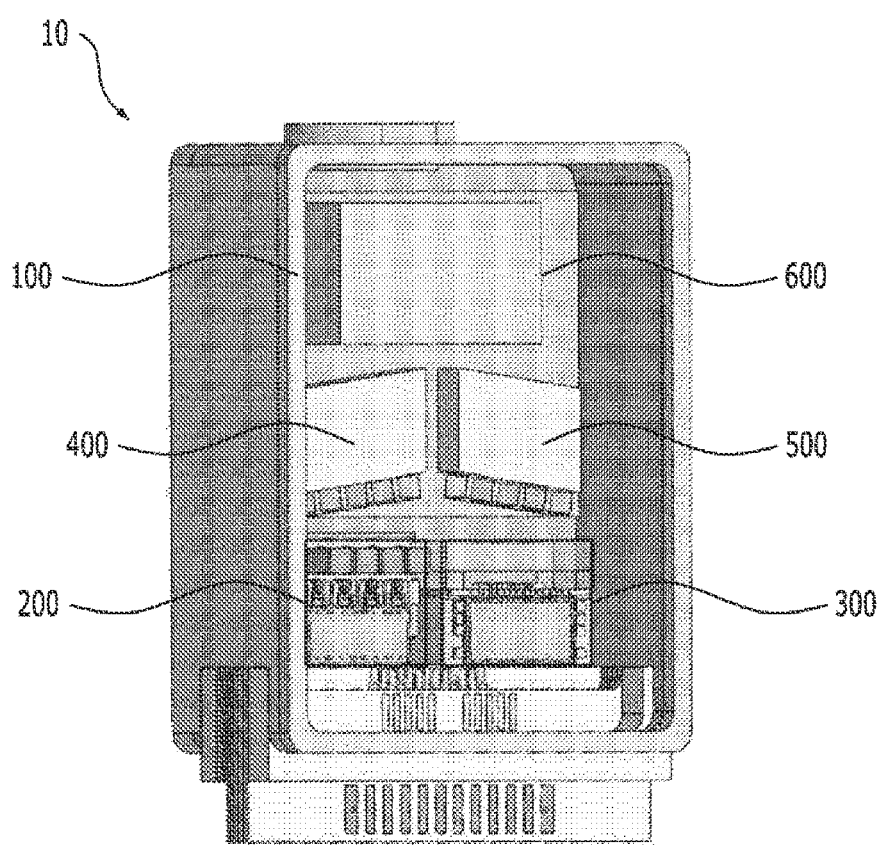

[FIG. 1B]
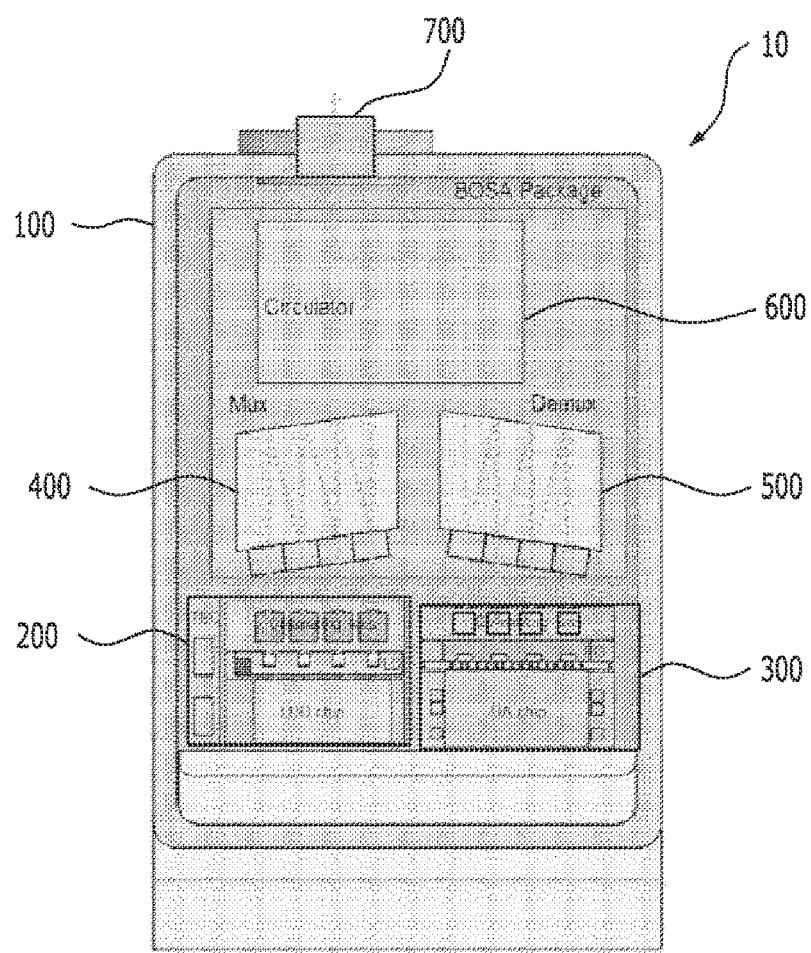

[FIG. 2]
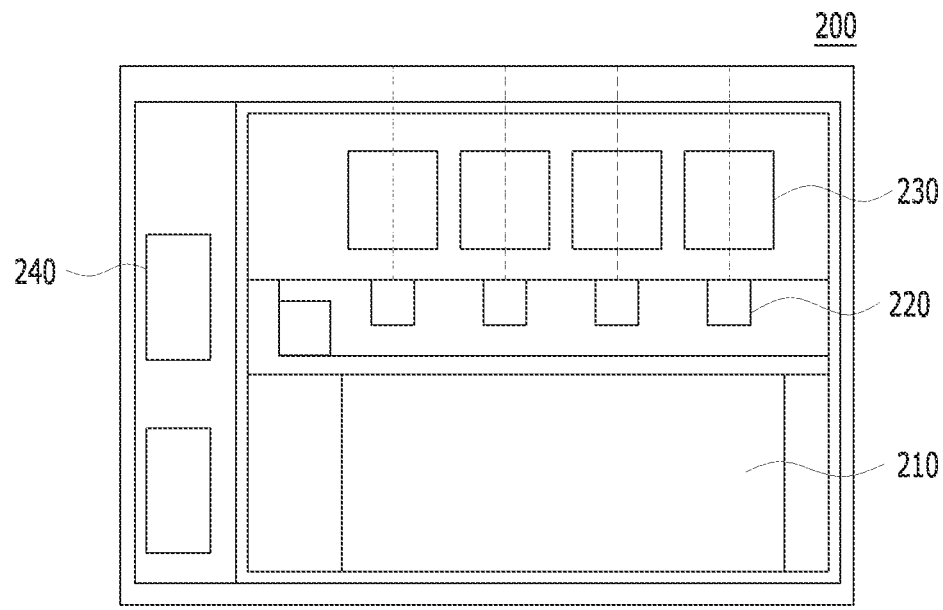
[FIG. 3]
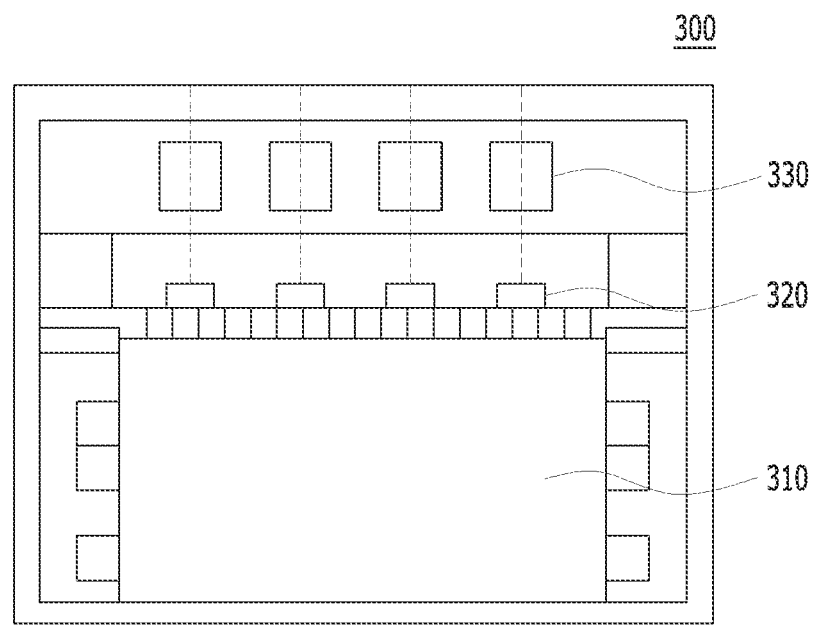

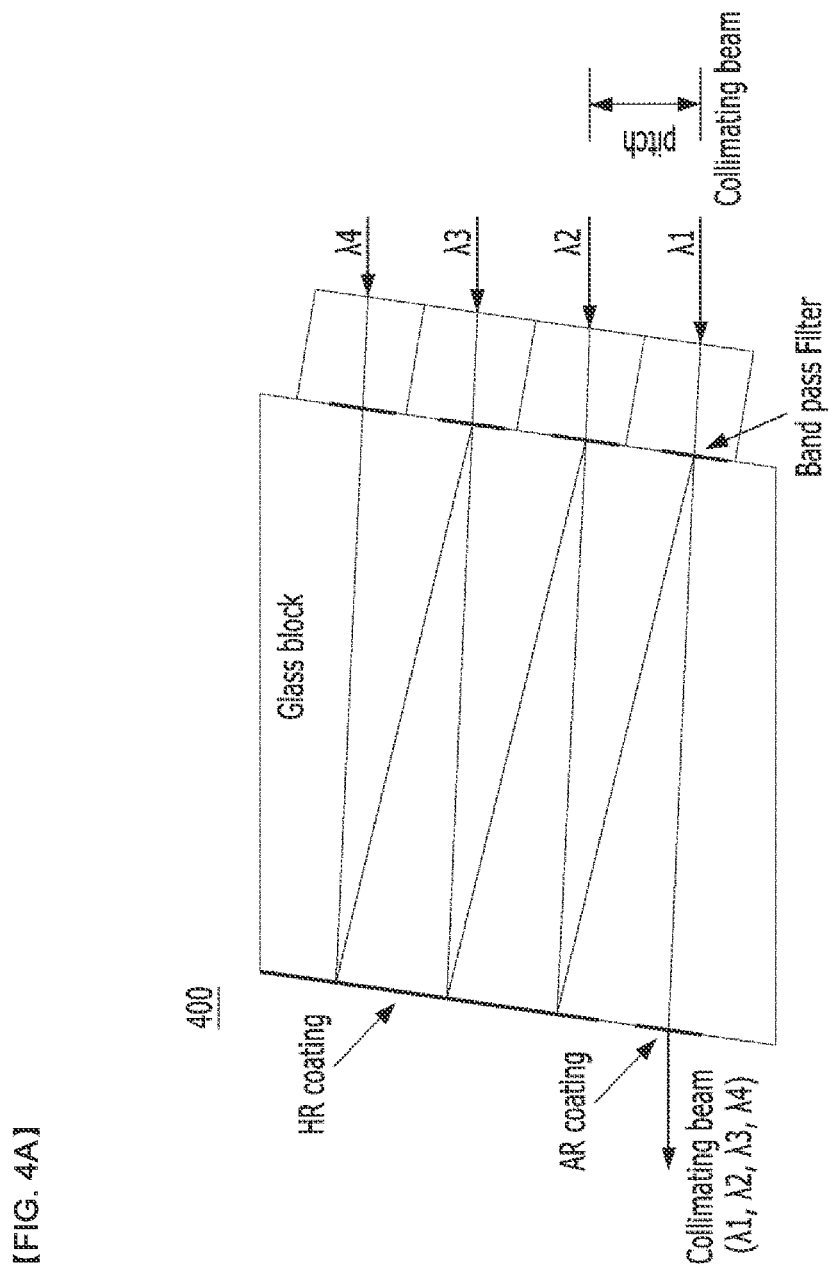
[FIG. 4A]

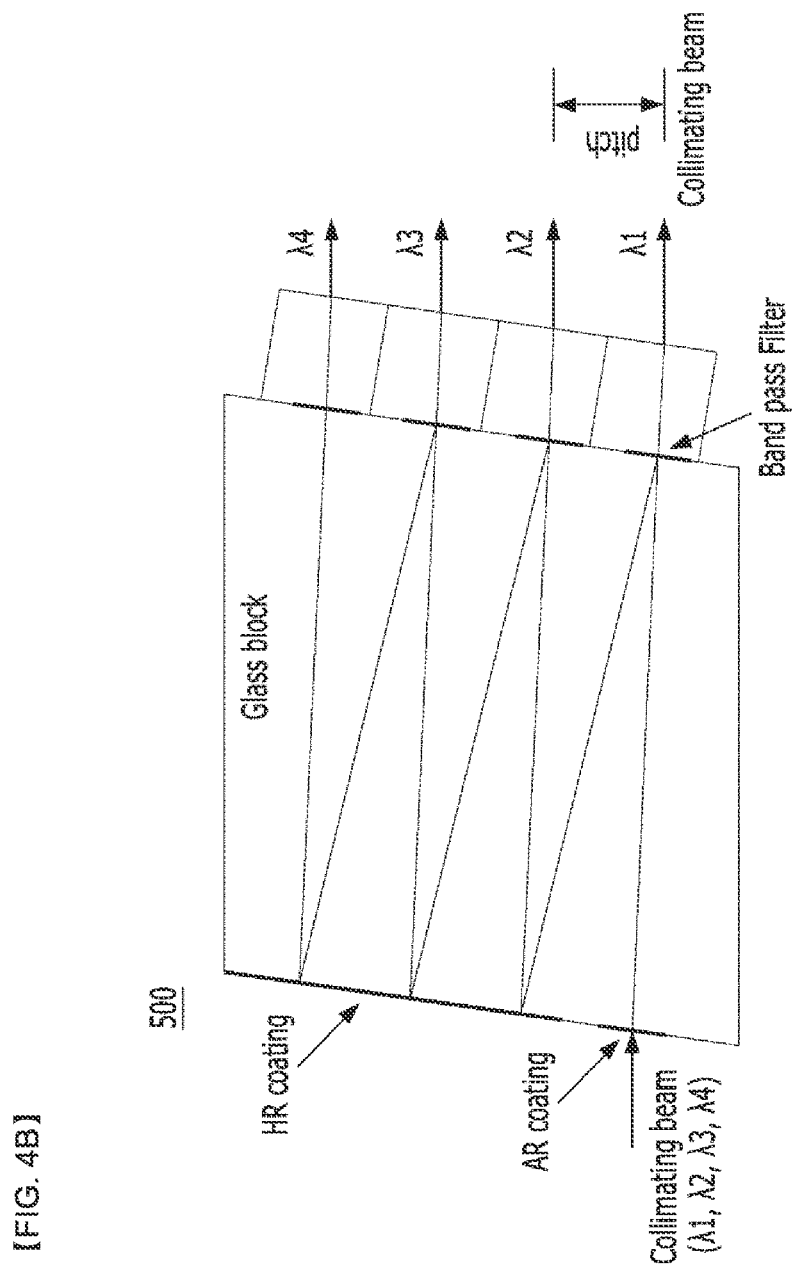
[FIG. 4B]

[FIG. 5]
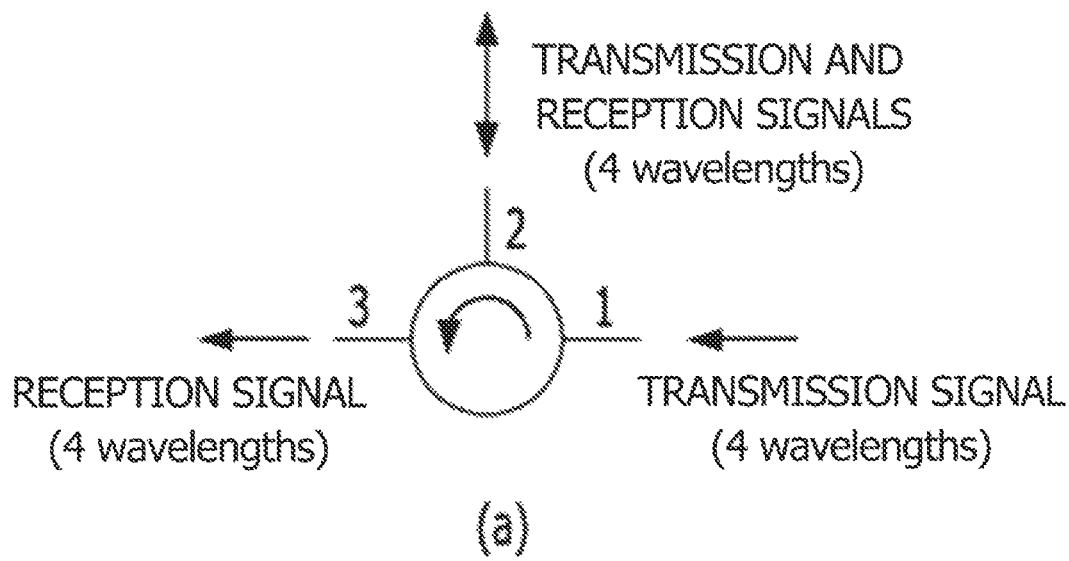
(a)
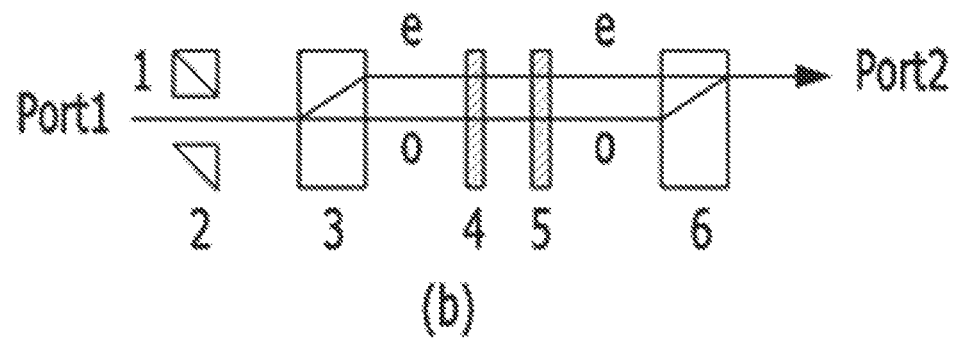
(b)
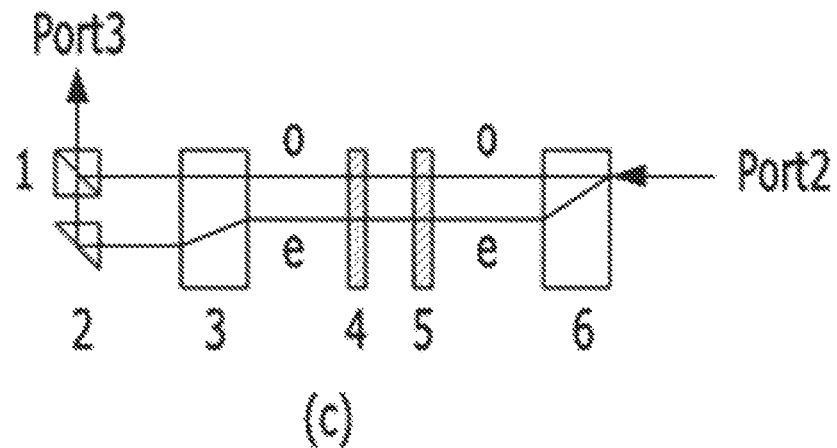
(c)

[FIG. 6]
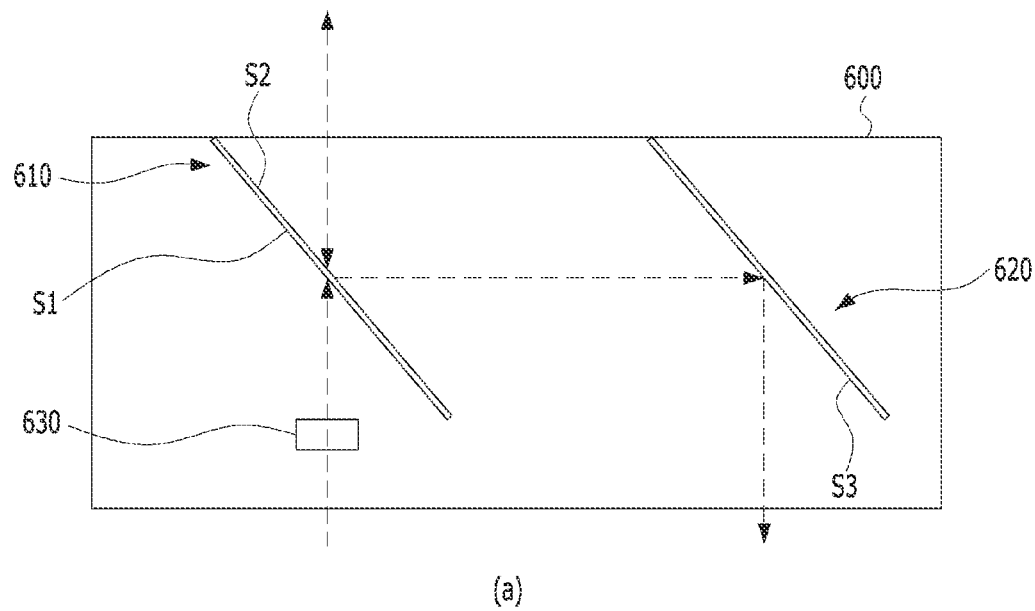
(a)
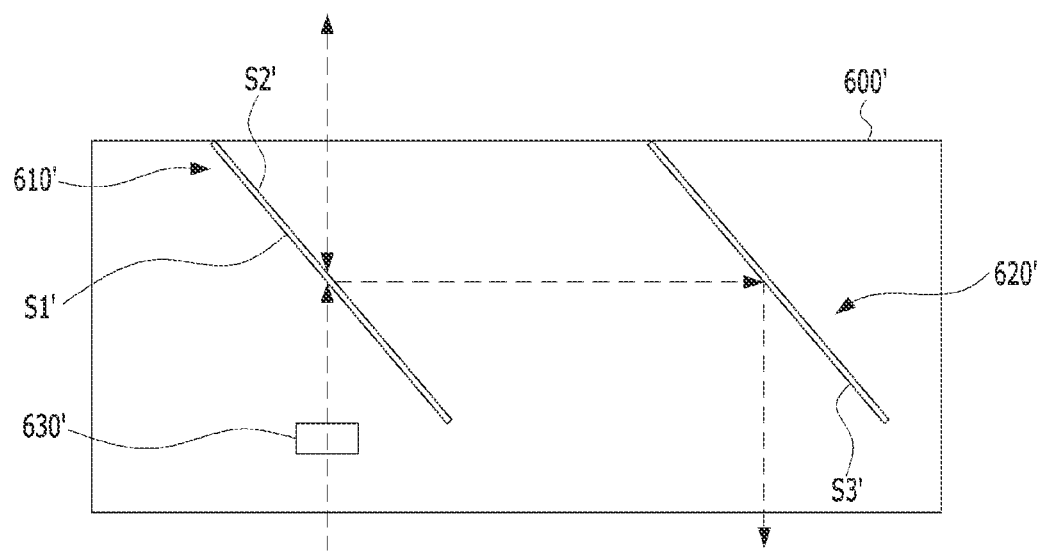
(b)

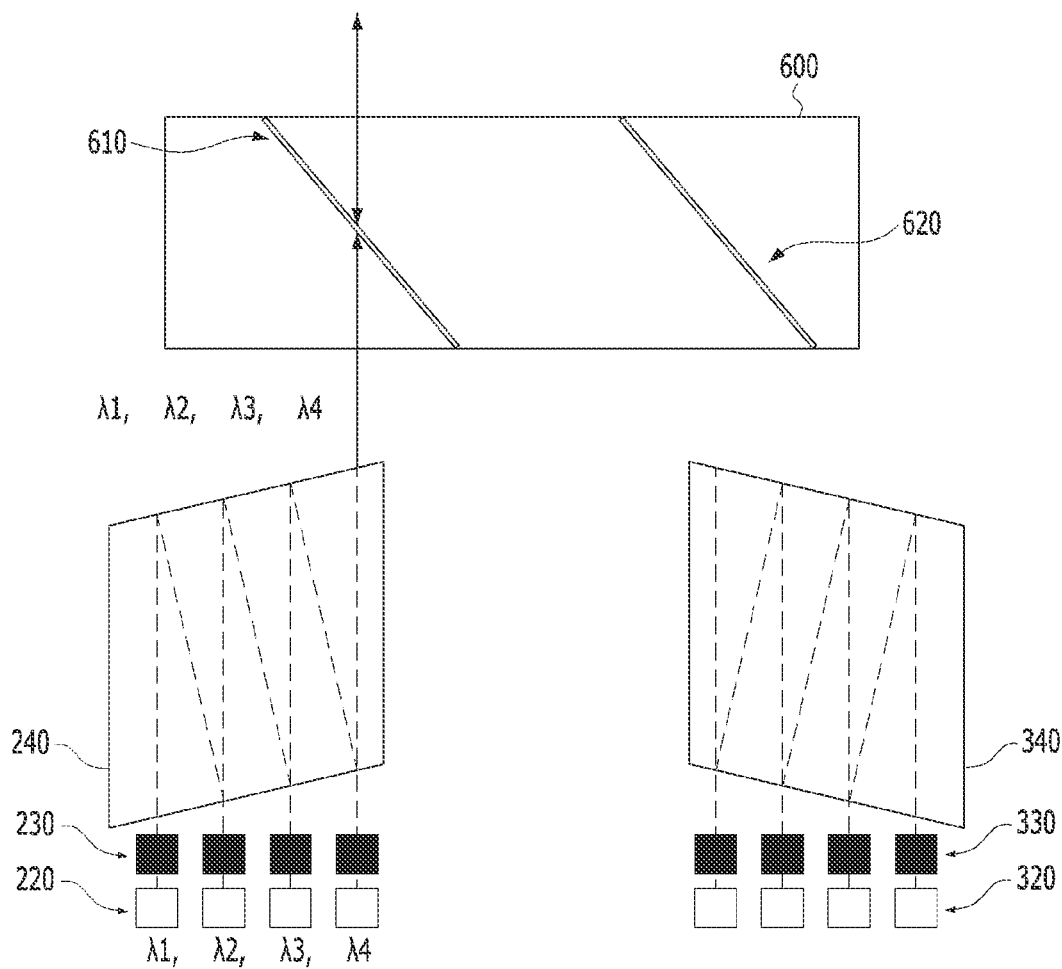
[FIG. 7A]

[FIG. 7B]
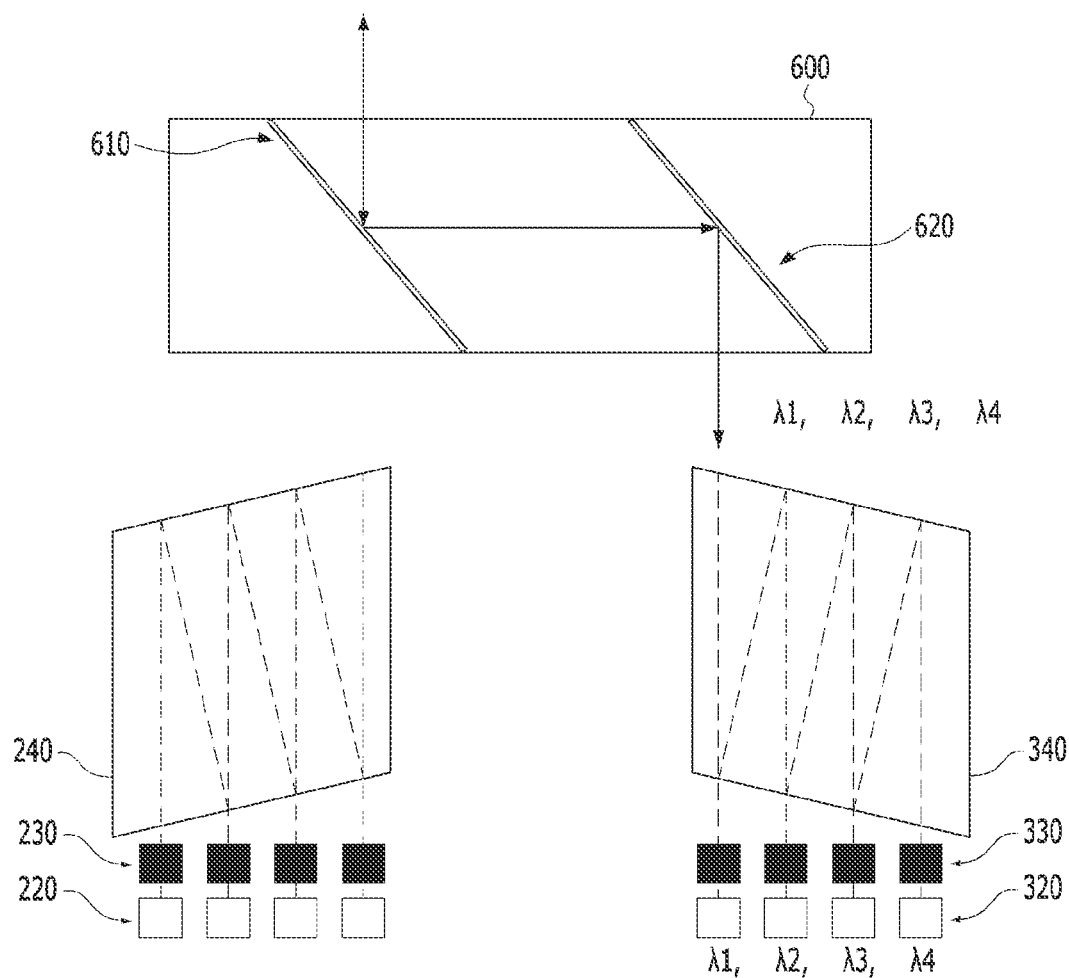

[FIG. 8]
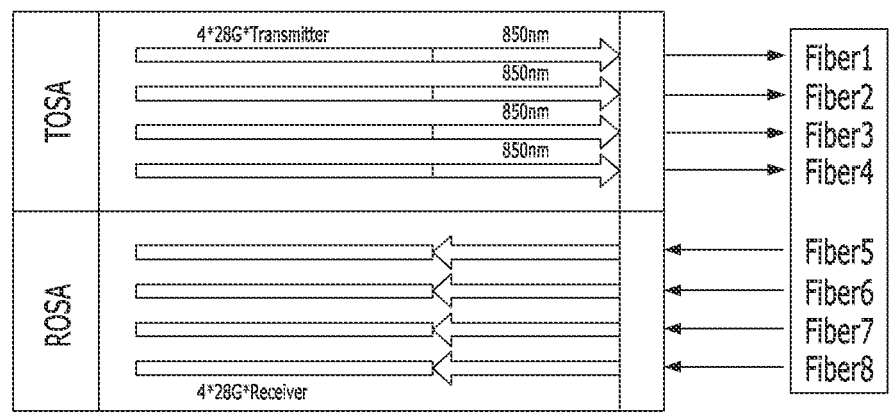
(a)
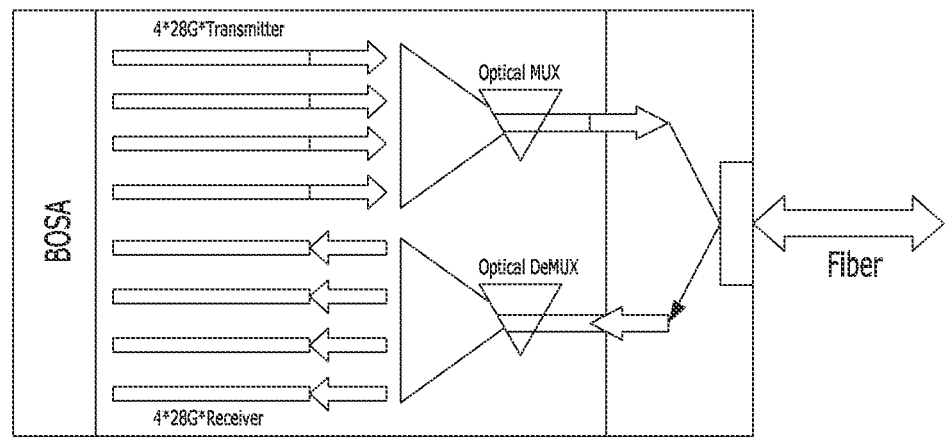
(b)

MULTI-CHANNEL, BI-DIRECTIONAL OPTICAL COMMUNICATION MODULE

RELATED APPLICATIONS

This application is a National Phase of PCT Patent Application No. PCT/KR2018/015035 having International filing date of Nov. 30, 2018, which claims the benefit of priority of Korean Patent Application No. 10-2018-0143601 filed on Nov. 20, 2018. The contents of the above applications are all incorporated by reference as if fully set forth herein in their entirety.

FIELD AND BACKGROUND OF THE INVENTION

An embodiment relates to an optical communication module, and more particularly, to a multi-channel, bi-directional optical communication module in which each of a transmission channel and a reception channel includes a plurality of multi-channels using the same wavelength and an optical signal for each of the plurality of multi-channels is transmitted and received by being multiplexed and demultiplexed using a multiplexer and a demultiplexer.

In general, an optical communication module refers to one package in which various optical communication functions are accommodated and modularized to enable connection with optical fiber. Recently, a bi-directional optical communication module has been mainly used, which is one into which a transmitter optical sub-assembly (TOSA) using a laser diode having low power consumption and being available for long distance as a light source and a receiver optical sub-assembly (ROSA) performing optical communication using a photodiode are modularized.

However, a conventional optical communication module includes a TOSA and a ROSA, such that optical fiber required for transmission is used twice as much, increasing price burden.

PRIOR TECHNICAL DOCUMENT (Patent Document 1) Korean Patent Registration Notification No. 10-0848136

SUMMARY OF THE INVENTION

Provided is a multi-channel, bi-directional optical communication module in which each of a transmission channel and a reception channel includes a plurality of multi-channels using the same wavelength and an optical signal for each of the plurality of multi-channels is transmitted and received by being multiplexed and demultiplexed using a multiplexer and a demultiplexer.

According to an aspect of the present disclosure, a multi-channel, bi-directional optical communication module includes a transmission unit transmitting an optical transmission signal for each of a plurality of channels, a multiplexer multiplexing the transmitted optical transmission signal for each of the plurality of channels to output one multi-channel optical transmission signal, a circulator passing the multi-channel optical transmission signal output from the multiplexer therethrough to transmit the multi-channel optical transmission signal to an optical fiber and reflecting a multi-channel optical reception signal received from the optical fiber, a demultiplexer demultiplexing one multi-channel optical reception signal reflected from the circulator to output an optical reception signal for each of the plurality of channels, a reception unit receiving the output optical reception signal for each of the plurality of channels and converting the received optical reception signal into an electrical signal for each of the plurality of channels, and a body unit in which the transmission unit, the multiplexer, the circulator, the demultiplexer, and the reception unit are disposed, in which a wavelength of the optical transmission signal for each of the plurality of channels is the same as a wavelength of the optical reception signal for each of the plurality of channels, and the circulator includes a first optical filter which passes a multi-channel optical transmission signal incident to a surface thereof therethrough and reflects a multi-channel optical reception signal incident to the other surface thereof, and a second optical filter which is disposed in parallel with the first optical filter and reflects the multi-channel optical reception signal reflected from the first optical filter to the demultiplexer.

A surface of the first optical filter may be coated with an anti-reflection (AR) material and the other surface of the first optical filter may be coated with a high-reflection (HR) material, and a surface of the second optical filter may be coated with the AR material.

The circulator may further include an optical isolator which transmits the multi-channel optical transmission signal output from the multiplexer to the first optical filter.

The transmission unit may include a laser diode driver (LDD) chip generating an electrical signal for each of the plurality of channels to be transmitted and a plurality of laser diodes (LDs) converting the generated electrical signal for each of the plurality of channels into the optical transmission signal for each of the plurality of channels and transmitting the optical transmission signal.

The transmission unit may further include a plurality of collimating lenses which are disposed apart by a certain distance, respectively, in output sides of the plurality of LDs and condense light respectively output from the plurality of LDs.

The reception unit may include a plurality of photo diodes (PDs) respectively receiving an optical reception signal for each of the plurality of channels, output from the demultiplexer, and converting the received optical reception signal into an electrical signal for each of the plurality of channels and a trans-impedance amplifier (TIA) chip processing the converted electrical signal for each of the plurality of channels.

The reception unit may further include a plurality of collimating lenses which are disposed apart by a certain distance, respectively, in input sides of the plurality of PDs and condense light output from the demultiplexer.

The multi-channel, bi-directional optical communication module may further include a thermoelectric cooler disposed inside the body unit.

According to another aspect of the present disclosure, a multi-channel, bi-directional optical communication module includes a transmission unit transmitting an optical transmission signal for each of a plurality of channels, a multiplexer multiplexing the transmitted optical transmission signal for each of the plurality of channels to output one multi-channel optical transmission signal, a circulator passing the multi-channel optical transmission signal output from the multiplexer therethrough to transmit the multi-channel optical transmission signal to an optical fiber and reflecting a multi-channel optical reception signal received from the optical fiber, a demultiplexer demultiplexing one multi-channel optical reception signal reflected from the circulator to output an optical reception signal for each of the plurality of channels, a reception unit receiving the output optical reception signal for each of the plurality of channels and converting the received optical reception signal into an electrical signal, and a body unit in which the transmission unit, the multiplexer, the circulator, the demultiplexer, and the reception unit are disposed, in which a wavelength of the optical transmission signal for each of the plurality of channels is the same as a wavelength of the optical reception signal for each of the plurality of channels, and the circulator includes a splitter which passes a multi-channel optical transmission signal incident to a surface thereof therethrough and reflects a multi-channel optical reception signal incident to the other surface thereof, and a reflection mirror which is disposed in parallel with the splitter and reflects the multi-channel optical reception signal reflected from the splitter to the demultiplexer.

A surface of the splitter may be coated with an anti-reflection (AR) material, and the other surface of the splitter may be coated with a high-reflection (HR) material.

The circulator may further include an optical isolator which transmits the multi-channel optical transmission signal output from the multiplexer to the first optical filter.

According to another aspect of the present disclosure, a multi-channel, bi-directional optical communication module includes a transmission unit transmitting an optical transmission signal for each of a plurality of channels, a multiplexer multiplexing the transmitted optical transmission signal for each of the plurality of channels to output one multi-channel optical transmission signal, a circulator passing the multi-channel optical transmission signal output from the multiplexer therethrough to transmit the multi-channel optical transmission signal to an optical fiber and reflecting a multi-channel optical reception signal received from the optical fiber, a demultiplexer demultiplexing one multi-channel optical reception signal reflected from the circulator to output an optical reception signal for each of the plurality of channels, a reception unit receiving the output optical reception signal for each of the plurality of channels and converting the received optical reception signal into an electrical signal for each of the plurality of channels, and a body unit in which the transmission unit, the multiplexer, the circulator, the demultiplexer, and the reception unit are disposed, in which a wavelength of the optical transmission signal for each of the plurality of channels is the same as a wavelength of the optical reception signal for each of the plurality of channels, and the circulator includes a first port, a second port, and a third port, the multi-channel optical transmission signal input to the first port is output to the optical fiber through the second port, and the multi-channel optical reception signal input to the second port from the optical fiber is output to the demultiplexer through the third port.

According to an embodiment, each of a transmission channel and a reception channel includes a plurality of multi-channels using the same wavelength and an optical signal for each of the plurality of multi-channels is transmitted and received by being multiplexed and demultiplexed using a multiplexer and a demultiplexer, thereby enabling multi-channel, bi-directional optical communication using one optical communication module.

According to an embodiment, transmission and reception are performed using the same wavelength, such that parts, input and output loss, and volume may be reduced when compared to a conventional module using different optical paths.

According to an embodiment, a transmission and reception path using the same wavelength is distributed by using a circulator, thus reducing input and output loss and improving coupling efficiency.

BRIEF DESCRIPTION OF THE SEVERAL VIEWS OF THE DRAWINGS

FIGS. 1A and 1B are views illustrating a multi-channel, bi-directional optical communication module according to an embodiment of the present disclosure.

FIG. 2 is a view for describing a detailed structure of a transmission unit according to an embodiment of the present disclosure.

FIG. 3 is a view for describing a detailed structure of a reception unit according to an embodiment of the present disclosure.

FIGS. 4A and 4B are views illustrating a multiplexer and a demultiplexer.

FIG. 5 is a view for describing a detailed structure of a circulator according to an embodiment of the present disclosure.

FIG. 6 is a view for describing a detailed structure of a circulator according to another embodiment of the present disclosure.

FIGS. 7A and 7B are views for describing the principle of transmitting an optical signal through one optical path.

FIG. 8 is a view for comparatively describing an optical path of an optical communication module according to an embodiment of the present disclosure.

DESCRIPTION OF SPECIFIC EMBODIMENTS OF THE INVENTION

Figure 9:
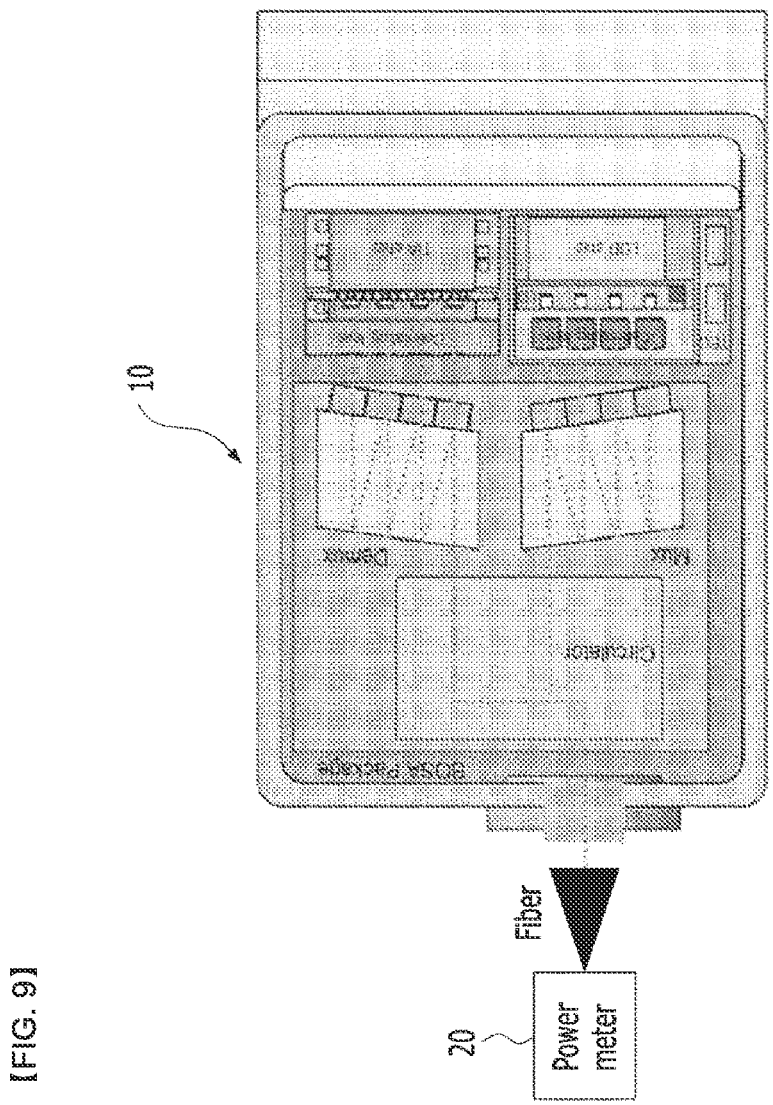
FIG. 9 is a view for describing an optical power level measurement principle according to an embodiment of the present disclosure.

Hereinafter, preferred embodiments of the present disclosure will be described with reference to the accompanying drawings.

However, the technical spirit of the present disclosure may be implemented in various different forms without being limited to some embodiments to be described, and one or more of components of the embodiments may be selectively combined and substituted for use within the range of the technical spirit of the present disclosure.

Moreover, terms (including technical and scientific terms) used in an embodiment of the present disclosure, unless apparently specially defined, may be interpreted as the same meaning as generally understood by those of ordinary skill in the art, and the meanings of terms used in common, such as those defined in dictionaries, may be interpreted in the context of the relevant art.

In addition, terms used in an embodiment of the present disclosure are intended to describe embodiments and are not intended to limit the present disclosure.

In the specification, a singular form may include a plural form unless the context specifically mentions, and "at least one (or one or more) of A, B, and (or) C" may include at least one combination among all possible combinations of A, B, and C.

To describe a component of an embodiment of the present disclosure, terms such as first, second, A, B, (a), (b), etc., may be used.

These terms are used merely for distinguishing one component from another component and do not limit the component to the essence, sequence, order, etc., of the component.

When it is described that a component is "connected", "coupled", or "joined" to another component, the component may be 'connected', 'coupled', or 'joined' to the other component through still another component between the component and the other component, as well as directly connected, coupled, or joined to the other component.

When it is described that a component is formed or disposed "on (above) or under (below)" another component, it may mean not only that the two components directly contact each other, but also that one or more other components are formed and disposed between the two components. The expression "on (above) or under (below)" may include a meaning of a downward direction as well as a meaning of an upward direction, with respect to one component.

An embodiment proposes a new optical communication module in which a transmission part and a reception part are packaged in one module, each of a transmission channel and a reception channel using the same wavelength includes a plurality of multi-channels, and an optical signal for each of the plurality of multi-channels is transmitted and received by being multiplexed and demultiplexed using a multiplexer and a demultiplexer.

FIGS. 1A and 1B are views illustrating a multi-channel, bi-directional optical communication module according to an embodiment of the present disclosure.

Referring to FIGS. 1A and 1B, a multi-channel, bi-directional optical communication module 10 according to an embodiment of the present disclosure may include a body unit 100, a transmission unit 200, a reception unit 300, a multiplexer 400, a demultiplexer 500, and a circulator 600.

The body unit 100 may be formed of metal or ceramic, and may have the transmitter 200, the receiver 300, the multiplexer 400, the demultiplexer 500, and the circulator 600 disposed therein, thus being packaged into one optical communication module capable of transmission and reception. The body unit 100 is formed of metal or ceramic, such that quality and reliability may be improved.

Since a transmission side, i.e., the transmission unit 200 and the multiplexer 400, and a reception side, i.e., the reception unit 300 and the demultiplexer 500, may be arranged in parallel in the body unit 100, and light is distributed through the circulator 600, a sealed package is assembled to improve transmission and reception performance of a high-speed optical signal by reducing a distance of a light source element and a light-receiving element with a main IC through efficient space usage.

The transmission unit 200 may receive an optical transmission signal for each of a plurality of channels to be transmitted.

FIG. 2 is a view for describing a detailed structure of a transmission unit according to an embodiment of the present disclosure.

Referring to FIG. 2, the transmission unit 200 according to an embodiment of the present disclosure may include a laser diode driver (LDD) chip 210, a plurality of laser diodes (LDs) 220, a plurality of collimating lenses 230, and a thermoelectric cooler (TEC) 240.

The LDD chip 210 may generate an electrical signal for each of the plurality of channels to be transmitted.

The plurality of LDs 220 may convert the electrical signal for each of the plurality of channels, which is generated by the LDD chip 210, into an optical transmission signal for each of the plurality of channels and transmit the optical transmission signal.

The plurality of collimating lenses 230 may be disposed apart by a certain distance in output sides of the plurality of LDs 220, respectively, and may condense light respectively emitted from the plurality of LDs 220 to respective input terminals of the multiplexer. In this way, by disposing the plurality of collimating lenses 230 for the plurality of LDs 220, optic alignment with the multiplexer 400 may be possible.

The thermoelectric cooler 240 may be disposed inside the body unit to lower high temperature generated by transmission of an optical signal. In this case, the thermoelectric cooler 240 may be disposed adjacent to the plurality of LDs 220 to reduce an influence of a temperature change, caused by transmission of an optical signal of the plurality of LDs 220. By reducing the influence of the temperature change in this way, the lifespan and quality of a product may be improved.

The reception unit 300 may be disposed in parallel with the transmission unit 200, and receive an optical reception signal for each of the plurality of channels.

FIG. 3 is a view for describing a detailed structure of a reception unit according to an embodiment of the present disclosure.

Referring to FIG. 3, the reception unit 300 according to an embodiment of the present disclosure may include a transimpedance amplifier (TIA) chip 310, a plurality of photo diodes (PDs) 320, and a plurality of collimating lenses 330.

The plurality of collimating lenses 330 may be disposed apart by a certain distance in input sides of the plurality of PDs, respectively, and may condense light output from the demultiplexer 500 to the plurality of PDs, respectively. In this way, by disposing the plurality of collimating lenses for the plurality of PDs 320, optic alignment with the demultiplexer 500 may be possible.

The plurality of PDs 320 may receive an optical reception signal for each of the plurality of channels, output from the demultiplexer 500, and convert the received optical reception signal into an electrical signal for each of the plurality of channels.

The TIA chip 310 may process the electrical signal for each of the plurality of channels, converted by the plurality of PDs 320.

The multiplexer 400 may multiplex the optical transmission signal for each of the plurality of channels to output a multi-channel optical transmission signal.

The demultiplexer 500 may demultiplex a multi-channel optical reception signal to output an optical reception signal for each of the plurality of channels.

FIGS. 4A and 4B are views illustrating a multiplexer and a demultiplexer.

Referring to FIG. 4A, the multiplexer 400 according to an embodiment of the present disclosure may multiplex wavelengths $\lambda 1$, $\lambda 2$, $\lambda 3$, and $\lambda 4$ input to respective input terminals to output a multi-channel optical transmission signal to an output terminal.

In the input terminals to which the wavelengths $\lambda 1$, $\lambda 2$, $\lambda 3$, and $\lambda 4$ are respectively input, filters may be disposed, respectively. Herein, the filter may be a band pass filter (BPF). In a waveguide through which each of the wavelengths $\lambda 1$, $\lambda 2$, $\lambda 3$, and $\lambda 4$ moves, a high-reflection (HR) material may be coated onto an end cross-section of a glass block in which the wavelengths $\lambda 2$, $\lambda 3$, and $\lambda 4$ move and an anti-reflection (AR) material may be coated onto an end cross-section of a glass block in which the wavelength $\lambda 1$ moves.

In this case, a filter having a wavelength appropriate for use and a channel spacing or pitch may be selected. A signal input to the multiplexer having such a structure may travel by passing through and being reflected from a glass block along a filter for each wavelength, thus being multiplexed into one output.

Referring to FIG. 4B, the demultiplexer 500 according to an embodiment of the present disclosure may demultiplex the multi-channel optical reception signal input to an input terminal thereof to output the wavelengths λ1, λ2, λ3, and λ4 to respective output terminals thereof.

In this case, a filter having a wavelength appropriate for use and a channel spacing or pitch may be selected. A signal input to the demultiplexer having such a structure may travel by passing through and being reflected from a glass block, thus being demultiplexed into multiple outputs through a glass block for each wavelength.

To use one optical path for an uplink transmission and a downlink transmission, the circulator 600 may pass the multi-channel optical transmission signal output from the multiplexer 400 therethrough to transmit the same to optical fiber, and reflect the multi-channel optical reception signal received from the optical fiber to transmit the same to the demultiplexer 500.

FIG. 5 is a view for describing a detailed structure of a circulator according to an embodiment of the present disclosure.

Referring to (a) of FIG. 5, a circulator according to an embodiment of the present disclosure may include three ports, in which a signal input to a first port may be output through only a second port and a signal input to the second port may be output through only a third port.

(b) of FIG. 5 shows a case where the signal input to the first port, i.e., a multi-channel optical transmission signal, is output to the optical fiber through the second port, and (c) of FIG. 5 shows a case where the signal input to the second port from the optical fiber, i.e., a multi-channel optical reception signal, is output through the third port. Herein, 1 may indicate a beam-splitting polarizer, 2 may indicate a reflection prism (mirror), 3 and 6 may indicate birefringent crystals, 4 may indicate a faraday rotator, and 5 may indicate a half waveplate.

FIG. 6 is a view for describing a detailed structure of a circulator according to another embodiment of the present disclosure.

Referring to (a) of FIG. 6, a circulator according to an embodiment of the present disclosure may include two optical filters, i.e., a first optical filter 610 and a second optical filter 620, and may further include an optical isolator 630 which transmits light incident from a transmission side, i.e., a multiplexer, to the first optical filter 610 and prevents the light from being re-incident to the transmission side by being reflected on an optical path.

In this case, the first optical filter 610 and the second optical filter 620 may be 45-degree optical filters.

The first optical filter 610 may pass the multi-channel optical transmission signal output from the multiplexer 400 therethrough to transmit the same to optical fiber, and reflect the multi-channel optical reception signal received from the optical fiber. To this end, a surface S1 of the first optical filter 610 into which the multi-channel optical transmission signal is incident and the other surface S2 into which the multi-channel optical reception signal is incident may be coated with a predetermined material.

For example, the surface S1 of the first optical filter 610 may be coated with an AR material, and the other surface S2 may be coated with an HR material. Herein, a reflectivity R1 of the AR material may have a range of 0%≤R1<0.2%, and a reflectivity R2 of the HR material may have a range of 99%<R2≤100%.

The second optical filter 620 may reflect the multi-channel optical reception signal reflected from the first optical filter 610 to the demultiplexer. To this end, a surface S3 of the second optical filter 620 into which the multi-channel optical reception signal is incident may be coated with a predetermined material. For example, the surface S3 of the second optical filter 620 may be coated with an HR material.

In this case, the first optical filter 610 and the second optical filter 620 may be disposed in parallel with each other. That is, an optical signal incident to the first optical filter 610 from the optical fiber and an optical signal reflected from the first optical filter 610 may be perpendicular to each other, and the optical signal reflected from the first optical filter 610 and an optical signal reflected from the second optical filter 620 may be perpendicular to each other.

By configuring the circulator 600 in which the first optical filter 610 and the second optical filter 620 are disposed in parallel with each other, transmission and reception of an optical signal may be possible through one optical fiber.

Referring to (b) of FIG. 6, a circulator 600' according to another embodiment of the present disclosure may include a splitter 610' and a reflection mirror 620' in place of two optical filters, and may further include an optical isolator 630' which transmits light incident from a transmission side, i.e., a multiplexer, to the splitter 610' and prevents the light from being re-incident to the transmission side by being reflected on the optical path.

The splitter 610' may pass the multi-channel optical transmission signal output from the multiplexer 400 therethrough to transmit the same to optical fiber, and reflect the multi-channel optical reception signal received from the optical fiber. To this end, a surface S1' of the splitter 610 into which the multi-channel optical transmission signal is incident and the other surface S2' into which the multi-channel optical reception signal is incident may be coated with a predetermined material.

For example, the surface S1' of the splitter 610 may be coated with an AR material, and the other surface S2' may be coated with an HR material.

The reflection mirror 620' may reflect the multi-channel optical reception signal reflected from the splitter 610' to the demultiplexer.

In this case, the splitter 610' and the reflection mirror 620' may be disposed in parallel with each other. That is, an optical signal incident to the first optical filter 610 from the optical fiber and an optical signal reflected from the first optical filter 610 may be perpendicular to each other, and an optical signal reflected from the first optical filter 610 and an optical signal reflected from the second optical filter 620 may be perpendicular to each other.

By configuring the circulator 600' in which the splitter 610' and the reflection mirror 620' are disposed in parallel with each other, transmission and reception of the optical signal may be possible through one optical fiber.

Light using the same wavelength in transmission and reception channels is distributed using such circulators 600 and 600', thus reducing input and output loss and improving coupling efficiency.

FIGS. 7A and 7B are views for describing the principle of transmitting an optical signal through one optical path.

Referring to FIG. 7A, the optical transmission signals having the different wavelengths λ1, λ2, λ3, and λ4 respectively for the plurality of channels from the plurality of LDs may be multiplexed into the multi-channel optical transmission signal by the multiplexer through the plurality of collimating lenses and may be incident to a surface of the first optical filter of the circulator.

In this way, the multi-channel optical transmission signal incident to the surface S1 of the first optical filter may pass through the first optical filter and may be output through the other surface S2 of the first optical filter, thus being transmitted to the optical fiber.

Referring to FIG. 7B, the multi-channel optical reception signal transmitted from the optical fiber may be incident to the other surface S2 of the first optical filter of the circulator and may be reflected from the other surface S2 of the first optical filter, thus being incident to the surface S3 of the second optical filter.

In this way, the multi-channel optical reception signal incident to the surface S3 of the second optical filter may be reflected, demultiplexed by the demultiplexer 500 into the optical reception signals having the different wavelengths λ1, λ2, λ3, and λ4 respectively for the plurality of channels, and respectively transmitted to the plurality of PDs through the plurality of collimating lenses.

As such, an optical signal to be transmitted and an optical signal received may have the same wavelength for each channel.

FIG. 8 is a view for comparatively describing an optical path of an optical communication module according to an embodiment of the present disclosure.

Referring to FIG. 8, an optical communication module according to an embodiment of the present disclosure, which is a module capable of multi-channel, bi-directional optical communication, may perform long-distance transmission and reception and adopt multi-channel multiplexer and demultiplexer available for large-volume transmission, thus allowing optic coupling and alignment.

As in (a), conventionally, as many optical fibers as channels are required because of different wavelengths for transmission and reception channels, but as in (b), in the present disclosure, one optical fiber may be used with the multiplexer and the demultiplexer because of the same wavelength for transmission and reception channels.

FIG. 9 is a view for describing an optical power level measurement principle according to an embodiment of the present disclosure.

Referring to FIG. 9, a transmission unit, a reception unit, a multiplexer, a demultiplexer, and a circulator may be disposed in a body unit of a multi-channel, bi-directional optical communication module 10 according to an embodiment of the disclosure, and transmission and reception of an optical signal may be performed through one optical fiber by using a circulator, allowing an optic power level of each of a transmission channel and a reception channel using one optical fiber to be measured through a power meter.

While the present disclosure has been described above with reference to preferred embodiments thereof, it would be understood by those of ordinary skill in the art that the present disclosure can be modified and changed variously without departing from the spirit and scope of the present disclosure as appended by the claims.

The invention claimed is:

1. A multi-channel, bi-directional optical communication module comprising:
a transmission unit transmitting an optical transmission signal for each of a plurality of channels;
a multiplexer multiplexing the transmitted optical transmission signal for each of the plurality of channels to output one multi-channel optical transmission signal;
a circulator passing the multi-channel optical transmission signal output from the multiplexer therethrough to transmit the multi-channel optical transmission signal to an optical fiber and reflecting a multi-channel optical reception signal received from the optical fiber;
a demultiplexer demultiplexing one multi-channel optical reception signal reflected from the circulator to output an optical reception signal for each of the plurality of channels;
a reception unit receiving the output optical reception signal for each of the plurality of channels and converting the received optical reception signal into an electrical signal for each of the plurality of channels; and
a body unit in which the transmission unit, the multiplexer, the circulator, the demultiplexer, and the reception unit are disposed,
wherein a wavelength of the optical transmission signal for each of the plurality of channels is the same as a wavelength of the optical reception signal for each of the plurality of channels, and
the circulator comprises a first optical filter which passes a multi-channel optical transmission signal incident to a surface thereof therethrough and reflects a multi-channel optical reception signal incident to the other surface thereof, and a second optical filter which is disposed in parallel with the first optical filter and reflects the multi-channel optical reception signal reflected from the first optical filter to the demultiplexer.

2. The multi-channel, bi-directional optical communication module of claim 1, wherein a surface of the first optical filter is coated with an anti-reflection (AR) material and the other surface of the first optical filter is coated with a high-reflection (HR) material, and
a surface of the second optical filter is coated with the AR material.

3. The multi-channel, bi-directional optical communication module of claim 1, wherein the circulator further comprises an optical isolator which transmits the multi-channel optical transmission signal output from the multiplexer to the first optical filter.

4. The multi-channel, bi-directional optical communication module of claim 1, wherein the transmission unit comprises:
a laser diode driver (LDD) chip generating an electrical signal for each of the plurality of channels to be transmitted; and
a plurality of laser diodes (LDs) converting the generated electrical signal for each of the plurality of channels into the optical transmission signal for each of the plurality of channels and transmitting the optical transmission signal.

5. The multi-channel, bi-directional optical communication module of claim 4, wherein the transmission unit further comprises a plurality of collimating lenses which are disposed apart by a certain distance, respectively, in output sides of the plurality of LDs and condense light respectively output from the plurality of LDs.

6. The multi-channel, bi-directional optical communication module of claim 1, wherein the reception unit comprises:
a plurality of photo diodes (PDs) respectively receiving an optical reception signal for each of the plurality of channels, output from the demultiplexer, and converting the received optical reception signal into an electrical signal for each of the plurality of channels; and a trans-impedance amplifier (TIA) chip processing the converted electrical signal for each of the plurality of channels.

7. The multi-channel, bi-directional optical communication module of claim 6, wherein the reception unit further comprises a plurality of collimating lenses which are disposed apart by a certain distance, respectively, in input sides of the plurality of PDs and condense light output from the demultiplexer.

8. The multi-channel, bi-directional optical communication module of claim 1, further comprising a thermoelectric cooler disposed inside the body unit.

9. A multi-channel, bi-directional optical communication module comprising:
- a transmission unit transmitting an optical transmission signal for each of a plurality of channels;
- a multiplexer multiplexing the transmitted optical transmission signal for each of the plurality of channels to output one multi-channel optical transmission signal;
- a circulator passing the multi-channel optical transmission signal output from the multiplexer therethrough to transmit the multi-channel optical transmission signal to an optical fiber and reflecting a multi-channel optical reception signal received from the optical fiber;
- a demultiplexer demultiplexing one multi-channel optical reception signal reflected from the circulator to output an optical reception signal for each of the plurality of channels;
- a reception unit receiving the output optical reception signal for each of the plurality of channels and converting the received optical reception signal into an electrical signal; and
- a body unit in which the transmission unit, the multiplexer, the circulator, the demultiplexer, and the reception unit are disposed,
- wherein a wavelength of the optical transmission signal for each of the plurality of channels is the same as a wavelength of the optical reception signal for each of the plurality of channels, and
- the circulator comprises a splitter which passes a multi-channel optical transmission signal incident to a surface thereof therethrough and reflects a multi-channel optical reception signal incident to the other surface thereof, and a reflection mirror which is disposed in parallel with the splitter and reflects the multi-channel optical reception signal reflected from the splitter to the demultiplexer.

10. The multi-channel, bi-directional optical communication module of claim 9, wherein a surface of the splitter is coated with an anti-reflection (AR) material, and the other surface of the splitter is coated with a high-reflection (HR) material.

11. The multi-channel, bi-directional optical communication module of claim 9, wherein the circulator further comprises an optical isolator which transmits the multi-channel optical transmission signal output from the multiplexer to the splitter.

12. A multi-channel, bi-directional optical communication module comprising:
- a transmission unit transmitting an optical transmission signal for each of a plurality of channels;
- a multiplexer multiplexing the transmitted optical transmission signal for each of the plurality of channels to output one multi-channel optical transmission signal;
- a circulator passing the multi-channel optical transmission signal output from the multiplexer therethrough to transmit the multi-channel optical transmission signal to an optical fiber and reflecting a multi-channel optical reception signal received from the optical fiber;
- a demultiplexer demultiplexing one multi-channel optical reception signal reflected from the circulator to output an optical reception signal for each of the plurality of channels;
- a reception unit receiving the output optical reception signal for each of the plurality of channels and converting the received optical reception signal into an electrical signal for each of the plurality of channels; and
- a body unit in which the transmission unit, the multiplexer, the circulator, the demultiplexer, and the reception unit are disposed,
- wherein a wavelength of the optical transmission signal for each of the plurality of channels is the same as a wavelength of the optical reception signal for each of the plurality of channels, and
- the circulator comprises a first port, a second port, and a third port, the multi-channel optical transmission signal input to the first port is output to the optical fiber through the second port, and the multi-channel optical reception signal input to the second port from the optical fiber is output to the demultiplexer through the third port.

* * * * *